July 13, 1965 R. J. HARRISON 3,194,876

ELECTRICAL COMPONENT WITH PERIPHERAL MOUNTING MEANS FOR A BENT LEAD

Filed Jan. 31, 1963

*INVENTOR.*
REGINALD J. HARRISON
*BY*
*Connolly and Hutz*
HIS ATTORNEYS

United States Patent Office 3,194,876
Patented July 13, 1965

3,194,876

ELECTRICAL COMPONENT WITH PERIPHERAL MOUNTING MEANS FOR A BENT LEAD

Reginald J. Harrison, Southall, England, assignor to Sprague Electric Company, North Adams, Mass., a corporation of Massachusetts Filed Jan. 31, 1963, Ser. No. 255,408
Claims priority, application Great Britain, Feb. 20, 1962, 6,509/62
1 Claim. (Cl. 174—52)

This invention relates to plastic encased electrical components, and more particularly to such components having mounting means thereon.

Plastic encased electrical components are frequently mounted on a panel or like plate, such, for instance, as that on which metal elements are deposited to constitute a printed circuit. In such cases it is generally convenient that all the lead-wires from the component shall extend in the same direction for ready connection, either to such deposited elements or to other components mounted on the same panel or plate. Very often, however, the lead-wires do not all emerge from that end or side of the component which faces the panel or other supporting member, this being notably the case with cylindrical capacitors, to which the present invention is especially applicable.

In components of this form, for instance, capacitors of cylindrical shape, it is very usual for two lead-wires to emerge axially from opposite ends. For the purpose of vertically mounting such a capacitor on a wiring board panel or the like, it has been proposed in the prior art to fit one end of the capacitor with an insulating cap, through the center of which the lead-wire at that end projects while the other lead-wire is bent over outside the capacitor and threaded through a passage in an external rib on the cap. It has also been suggested in the art, in the case of a capacitor enclosed in a casing to form a protuberance on the casing through which a lead-wire, which is similarly bent over the outside of the latter, is passed. In either construction it is necessary to thread the bent-over lead-wire through an aperture, and this is a costly time-consuming operation which subjects the lead-wire to excessive bending, with resultant detriment to the seal between the lead-wire and the casing at the point where the lead-wire emerges.

It is an object of this invention to provide a plastic encased electrical component that does not suffer the disadvantages of the prior art.

It is another object of this invention to provide a plastic encased electrical component having axially extending lead-wires with a simplified means for positioning the lead-wires for vertical mounting of the component on a wiring board or like panel.

It is a further object of this invention to provide a plastic encased electrical component having lead-wire positioning means that cooperates with sealing means to maintain a seal at the point where the lead-wire emerges from the casing.

These and other objects of this invention will become more apparent by consideration of the following description and claims taken together with the accompanying drawing, which illustrates, by way of example, two forms of casing for an electrical component in accordance therewith and wherein:

According to the invention, in a plastic cup or casing for an electrical component, there is provided, on the external surface, a slot for the reception of a lead-wire which, from its point of emergence from the component or casing, has been bent over to be alongside such component or casing. Preferably, the mouth of the slot is slightly narrower than the width of the lead-wire, so that, for the insertion of the latter, a small amount of lateral force is required, but, once the lead-wire is located in the slot, by reason of the resilience of the plastic material of the cup or casing, it is retained therein against the likelihood of accidental removal. In any event, insertion of the lead-wire into the slot is effected by a lateral movement, the necessity for the radical bending required by a threading action being eliminated.

For the purpose of the invention, the slot might be formed in the body of the casing or cup itself, but normally it is preferred to constitute it by two lugs or projections from the casing or cup so located as to leave the required slot-like space between them. The shape and dimensions of the projections may be such that, the wire haivng been inserted in the slot, it is gripped between the projections and the body of the casing or cup.

Figure 1:
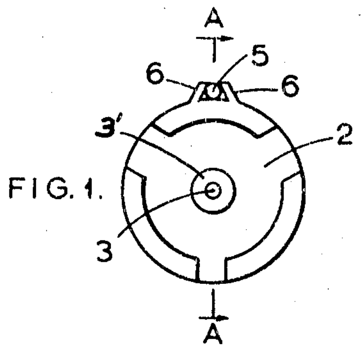
FIGURE 1 is an end view of a casing for a component such as a capacitor, having round wire leads.
Figure 2:
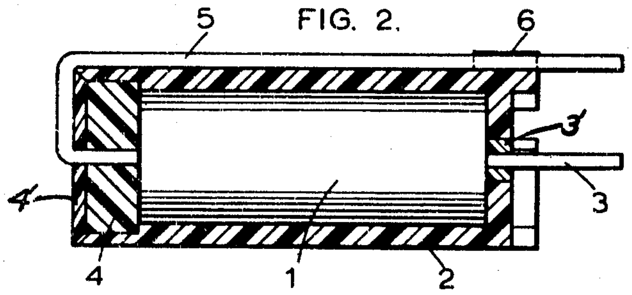
FIGURE 2 is a longitudinal section on the line A—A of FIGURE 1.

Referring to FIGURES 1 and 2, the electrical component 1 is enclosed in a casing 2, normally of insulating material preferably having substantial resilience, for example, polypropylene. One of the lead-wires 3 from the component 1 extends through an aperture in sealing plug 3' in the closed end of the casing 2. The other end is fitted with closure means 4 secured by a cap member 4'. Closure means 4 accommodates the limited bending required to position lead-wire 5 between lugs 6, and thereby coacts to maintain the seal. A second lead-wire 5 from the component 1 extends through the closure 4 and is bent over to lie along the outside of the casing 2 substantially parallel to lead-wire 3.

Projecting from the outside of the casing 2, are two lugs 6 which, between them, constitute a slot for accommodating lead-wire 5. As indicated, the mouth of the slot is slightly narrower than the diameter of lead-wire 5, for the purpose above specified.

Figure 3:
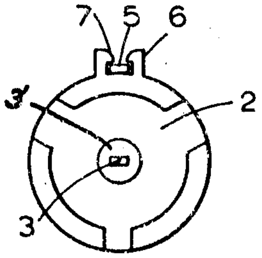
FIGURES 3 and 4 are respectively end views of modified casings.

If the lead 5 be a flat strip, it is preferable that, as shown in FIGURE 3, the opposing edges of the lugs 6 shall be shaped to provide lead-in guidance, that is to say, each or either is bevelled or rounded, the distance between the edges being, however, slightly less than the width of the strip 5 as before. In this instance the projections or lugs 6 are suitably parallel rather than inclined and are provided with small internal flanges 7 so that, when the strip 5 has been pressed home into position, it is held thereby against withdrawal.

Figure 4:
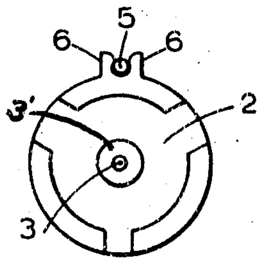

FIGURE 4 shows a construction, analogous to that of FIGURE 3, suitable for a round lead 5.

In applying the invention to a component enclosed in a casing, as indicated in the drawing, the slot is most appropriately located near that end of the casing from which the lead-wire not accommodated in the slot emerges. By this means, mutual spacing of the lead-wires by a predetermined distance, suitable for cooperation with a printed wiring panel or the like to which the component is to be fitted, is secured.

The application of the invention to the case in which the component 1 is accommodated in a cup rather than in a casing will be evident without further description, the cup being located at that end of the component from which the lead 3 emerges and being provided outside with the lugs or projections 6.

What is claimed is:

An electrical component with mounting means comprising a component section having a pair of lead-wires extending axially from opposite ends thereof, said component being housed within a resilient plastic casing having a pair of oppositely disposed closed ends, said lead-wires emerging from opposite ends of said casing through closure members at said closed ends, one of said lead-wires being bent parallel to the other of said lead-wires whereby said lead-wires extend beyond the same end of said casing, said bent lead-wire being releasably secured to said casing adjacent said same end between a pair of integral resilient lugs defining a slot therebetween, the one of said closure members through which said bent lead-wire emerges being a thick disc between said component section and the adjacent one of said closed ends thereby spacing the bend away from said component section.

References Cited by the Examiner

UNITED STATES PATENTS

| | | | |
|---|---|---|---|
| 2,182,446 | 12/39 | Nelson | 339—119 X |
| 2,292,140 | 8/42 | Lofgren. | |
| 2,561,740 | 6/51 | Kennedy. | |

FOREIGN PATENTS

| | | |
|---|---|---|
| 872,071 | 6/61 | Great Britain. |
| 1,213,316 | 10/59 | France. |
| 1,059,521 | 6/59 | Germany. |
| 1,069,722 | 11/59 | Germany. |

LARAMIE E. ASKIN, *Primary Examiner.*

JOHN P. WILDMAN, *Examiner.*